No. 725,540. PATENTED APR. 14, 1903.
G. CAWLEY.
STEAM BOILER.
APPLICATION FILED JUNE 3, 1902.
NO MODEL.
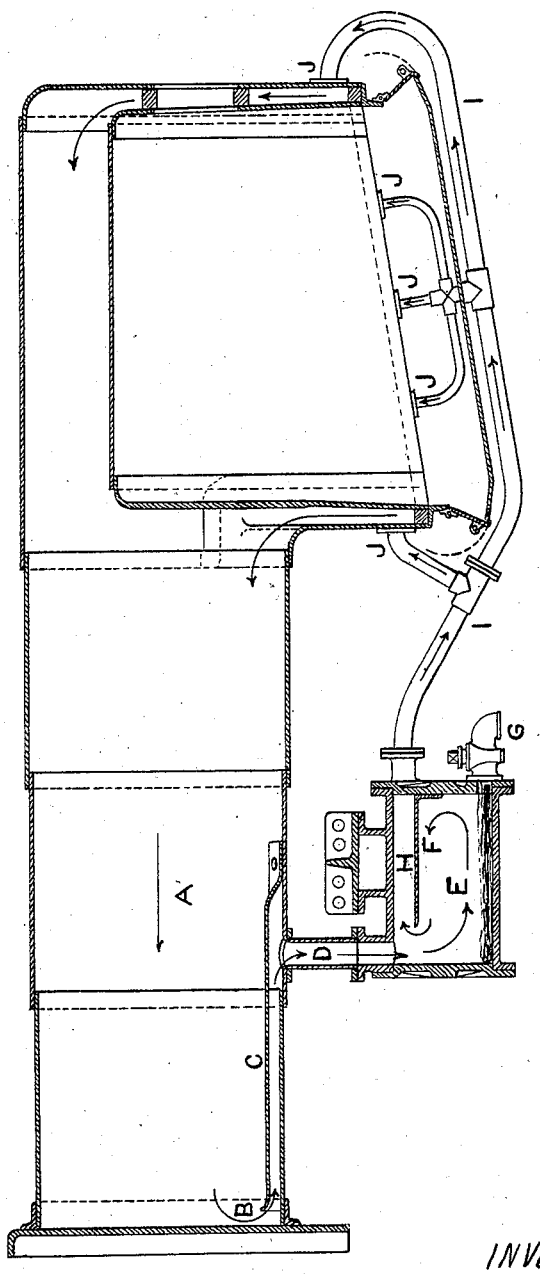
WITNESSES:
Edna W. Collins
F. W. Wright
INVENTOR
GEORGE CAWLEY
BY Howson and Howson
HIS ATTORNEYS.

UNITED STATES PATENT OFFICE.

GEORGE CAWLEY, OF WESTMINSTER, ENGLAND.

STEAM-BOILER.

SPECIFICATION forming part of Letters Patent No. 725,540, dated April 14, 1903.

Application filed June 3, 1902. Serial No. 110,119. (No model.)

*To all whom it may concern:*

Be it known that I, GEORGE CAWLEY, civil and mechanical engineer, a subject of the King of Great Britain and Ireland, residing at 29 Great George street, in the city of Westminster, England, have invented certain new and useful Improvements in Steam-Boilers; and I do hereby declare the following to be a full, clear, and exact description of the invention, such as will enable others skilled in the art to which it appertains to make and use the same.

My invention relates to a circulatory system for the steam-boilers of locomotive-engines wherein connection is made between the fire-box end of the boiler and the smoke-box end by means of a passage in which is a mud-collecting chamber; and my invention has for its object to provide improved means on this principle whereby a better circulation of the water is obtained and solid matter or mud is more efficiently deposited and collected.

To this end my invention consists of the following arrangement and combination of parts.

The accompanying drawing represents a locomotive-boiler provided with an arrangement in accordance with my invention, the said arrangement being in longitudinal section.

At the smoke-box end B of the boiler A, where the heating-surface has a relatively low evaporative effect, I connect a pipe D, and as an axle of the locomotive has to be accommodated and the pipe has to protrude from the boiler at some little distance from the end the said pipe is continued near to the said end B by a passage inside the boiler and inclosed between the bottom thereof and the plate C and constituting a continuation of the pipe D. The said pipe D is vertically disposed and opens into a chamber E of a capacity such as to reduce the velocity of the flow of water through the said chamber. A baffle-plate F is fixed near the upper part of this chamber E, so as not to obstruct the outlet for water from the pipe D, and from the space above this plate F opens the pipe I, which pipe I extends to the fire-box end of the boiler and communicates with the water-space around the said fire-box by a number of branch pipes J J, so as to cause the water to be distributed throughout the said space.

G is a cock by which deposit can be removed from the chamber E. If preferred, the removal can be effected by taking off the end cover of the said chamber E.

Water passes from the extremity of the smoke-box end of the boiler through the passage C and down the pipe D into the chamber E, where, as the flow of water is vertically downward and the velocity of flow is reduced, solid matter or mud deposits from the water, the baffle-plate F (while not interfering with the incoming water) keeping this place of deposit comparatively quiescent and directing the flow of water along the upper surface H of the chamber E, so that the deposit in the lower part of the chamber E may be disturbed as little as possible. The water leaves the chamber E by the pipe I and enters the water-space surrounding the fire-box in such a way as to be distributed therein, and the water ascends and passes back to the extremity of the smoke-box end of the water-space of the boiler, thereby inducing a very strong and continuous circulation of water through the whole of the boiler from end to end and through pipes and chamber aforesaid, increasing the evaporative efficiency and working durability of the boiler.

I claim as my invention—

1. In locomotive steam-boilers, a passage giving communication between the part of the boiler where the heating effect is lowest and the part of the water-space surrounding the fire-box, the said passage being provided with a number of branches which enter the water-space surrounding the fire-box at places some distance apart and the other end of the said passage being in communication by a vertical pipe with a space inclosed between the bottom of the boiler and a plate, the said space extending inside the boiler to the extremity of the smoke-box end thereof, substantially as described.

2. In locomotive steam-boilers, a passage giving communication between the part of the boiler where the heating effect is lowest and the water-space surrounding the fire-box and a depositing-chamber included in the said passage, the portion of the passage by which water enters the said chamber being vertical and continued to the smoke-box end of the interior of the boiler, by an internal passage and a baffle-plate interposed between the lower part of the said chamber and the outlet of water therefrom, and a branch opening out of the chamber and communicating with the water-space surrounding the fire-box by openings at some distance apart, substantially as described.

In testimony whereof I affix my signature in presence of two witnesses.

GEORGE CAWLEY.

Witnesses:
ERNEST ARNOLD,
PERCY READ GOLDRING.